United States Patent
Chaudhary et al.

(10) Patent No.: US 7,774,554 B2
(45) Date of Patent: Aug. 10, 2010

(54) SYSTEM AND METHOD FOR INTELLIGENT SOFTWARE-CONTROLLED CACHE INJECTION

(75) Inventors: Piyush Chaudhary, Highland, NY (US); Rama K. Govindaraju, Hopewell Junction, NY (US); Jay Robert Herring, Hyde Park, NY (US); Peter Hochschild, New Yor., NY (US); Chulho Kim, Poughkeepsie, NY (US); Rajeev Sivaram, West Orange, NJ (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/676,745

(22) Filed: Feb. 20, 2007

(65) Prior Publication Data
US 2008/0201532 A1    Aug. 21, 2008

(51) Int. Cl.
*G06F 12/00* (2006.01)
(52) U.S. Cl. .................. 711/142; 711/130; 711/144; 711/148; 711/156; 711/165
(58) Field of Classification Search ............... 711/142, 711/130, 144, 148, 156, 165
See application file for complete search history.

(56) References Cited

U.S. PATENT DOCUMENTS

| | | | |
|---|---|---|---|
| 5,428,799 A | 6/1995 | Woods et al. | |
| 5,588,131 A | 12/1996 | Borrill | |
| 5,784,697 A | 7/1998 | Funk et al. | |
| 5,802,576 A | 9/1998 | Tzeng et al. | |
| 5,850,558 A | 12/1998 | Qureshi et al. | |
| 6,021,456 A | 2/2000 | Herdeg et al. | |
| 6,029,223 A | 2/2000 | Klein | |
| 6,370,622 B1 * | 4/2002 | Chiou et al. | 711/146 |
| 6,604,060 B1 | 8/2003 | Ryan et al. | |
| 6,658,537 B2 | 12/2003 | Hughes et al. | |
| 6,711,650 B1 | 3/2004 | Bohrer et al. | |
| 7,155,572 B2 * | 12/2006 | Hughes et al. | 711/122 |
| 7,159,216 B2 | 1/2007 | McDonald | |
| 7,454,585 B2 * | 11/2008 | Arimilli et al. | 711/165 |
| 7,484,062 B2 * | 1/2009 | Arimilli et al. | 711/165 |
| 7,506,132 B2 * | 3/2009 | Arimilli et al. | 711/207 |

(Continued)

OTHER PUBLICATIONS

Hennessy et al., "Cache-Coherent Distributed Shared Memory: Perspectives on Its Development and Future Challenges," pp. 418-429, IEEE, Mar. 1999.*

(Continued)

*Primary Examiner*—Stephen C Elmore
(74) *Attorney, Agent, or Firm*—Mitch, Harris, Atty at Law, LLC; Andrew M. Harris; Matthew W. Baca (57) ABSTRACT

A system and method to provide injection of important data directly into a processor's cache location when that processor has previously indicated interest in the data. The memory subsystem at a target processor will determine if the memory address of data to be written to a memory location associated with the target processor is found in a processor cache of the target processor. If it is determined that the memory address is found in a target processor's cache, the data will be directly written to that cache at the same time that the data is being provided to a location in main memory.

20 Claims, 7 Drawing Sheets

U.S. PATENT DOCUMENTS

| | | |
|---|---|---|
| 2002/0065998 A1 | 5/2002 | Buckland |
| 2004/0128450 A1 | 7/2004 | Edirisooriya et al. |
| 2005/0033948 A1 | 2/2005 | Wei |
| 2006/0064518 A1 | 3/2006 | Bohrer et al. |

OTHER PUBLICATIONS

Briggs, et al., "Performance of Cache-Based Multiprocessors", Jun. 1986, pp. 181-190, School of Electrical Engineering Purdue University.

Milenkovic, et al., "Cache Injection on CAche Based Multiprocessors", Oct. 1998, School of Engineering, University of Belgrade, Austria.

Milutinovic, et al., "The Cache Injection/Cofetch Architecture: Initial Performance Evaluation", pp. 63-64, Jan. 1997, Proceedings Fifth International Symposium.

Verghese, "Operating System Support for improving Data Locality on CC-NUMA Compute Servers", pp. 279-289, 1996.

\* cited by examiner

SYSTEM AND METHOD FOR INTELLIGENT SOFTWARE-CONTROLLED CACHE INJECTION

This invention was made with Government support under Agreement No. NBCH3039004 awarded by DARPA. The Government has certain rights in the invention.

FIELD OF THE INVENTION

The invention relates to the field of information processing and more particularly relates to improving information processing efficiency by injecting data into one or more processor caches while the data is being written into memory.

BACKGROUND OF THE INVENTION

In the field of information processing, it is well known to cache data locally, since cache access can be significantly faster than access from a memory location. Information processing systems will typically cache data which is frequently accessed and/or data that is expected to be required next by a processing unit, based on related data most recently requested by the CPU. When the processing unit requires data, yet is unable to access that data from a local cache, the event is referred to as a "cache miss". Performance analysis work indicates that cache misses in the performance critical paths hurt the overall performance of the system posing both latency and throughput issues. Mechanisms that avoid cache misses in the critical paths are therefore important.

Present-day memory subsystems consist of a hierarchy of memories of differing speeds and sizes. There are multiple levels of caches, with the caches closest to the processor being of decreasing size and increasing speed, followed by a main memory that offers significantly higher access latency and lower throughput. The processor may prefetch a memory location to its cache based on anticipated processing needs. When such a prefetch occurs, the address of the memory location can be found in the cache. Alternatively, the address of a memory location may be found in a cache based on the processor having recently accessed the memory location directly. In either instance, the presence of the address in the processor's cache indicates that the processor in "interested" in the memory location and is, accordingly, interested in any updates to that memory location. Any memory updates to the memory location are written to the address of the memory location in the main memory, but should also, preferably, be reflected at any cache location that shows the memory address.

Further, in multi-processor nodes, each processor may have one or more dedicated levels of caches, any one of which may have previously-read data from a shared memory location. If the data has been updated at the shared memory location, the cache may include stale data. Cache coherence must be maintained, ensuring that two processors that share memory get coherent data and that an update to shared memory by one processor is reflected in future accesses by other processors.

Figure 1:
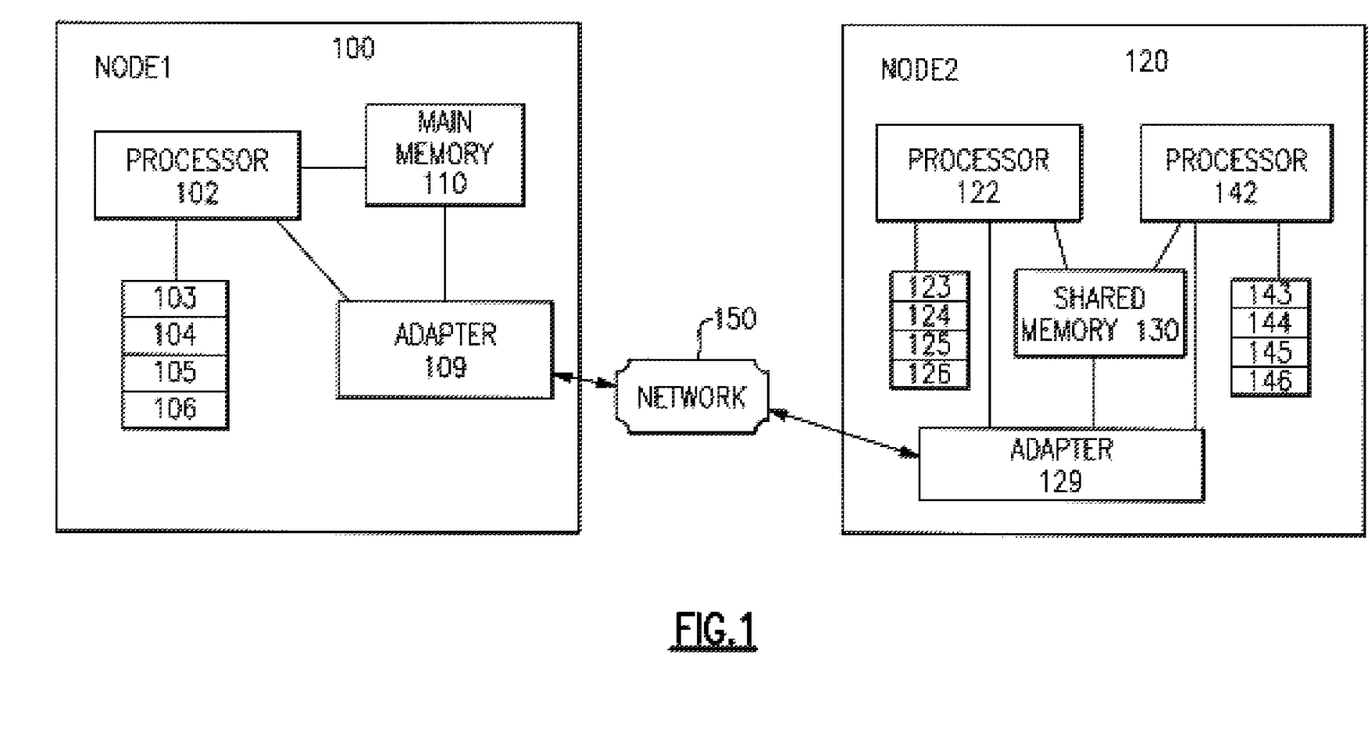
FIG. 1 illustrates a multi-node system in which the present invention may be implemented.

In the shared memory model, the processors may share one memory subsystem that performs data transfers and cache coherence. Alternatively, each processor in a multi-processor node may have its own associated memory subsystem. In a multi-node system or network, each node will generally have its own memory subsystem including an adapter for exchanging data with other nodes and for updating memory locations with data received from local processors or other nodes. FIG. 1 provides a block diagram of a multi-node system, including Node1 at 100 having processor at 102, processor cache locations 103-106, main memory location 110 and adapter/memory subsystem 109. Node2 at 120 is a multi-processor node having processor 122 with associated processor cache locations 123-126, processor 142 having processor cache locations 143-146, shared memory 130 and adapter/memory subsystem 129. The adapter 109 at Node1 can send data across network 150 to adapter 129 at Node2.

There are multiple memory transfer paths where current memory subsystems provide less than optimal performance and may cause significant overhead. One such path is in interprocessor communications among processors at different nodes across the network wherein a source processor on a first node sends data to a target processor on a second node. With reference to FIG. 1, assume data has been updated by processor 102 on Node1. The data is provided by source processor 102 to the Node1 adapter 109 to be communicated to a target processor, 122 on Node2. In many instances, as noted above, the target processor 122 may be waiting for the data to arrive and may be polling on the memory location, for example cache line 123, where it expects updated data to be placed. Because the memory location is being repeatedly accessed, it is likely that the address of the memory location is in the target processor's cache. When the data arrives on the target node, the target node's memory subsystem, the adapter 129 as illustrated in FIG. 1, can write it directly to memory 130 using a Direct Memory Access (DMA) engine (not illustrated).

However, due to the memory subsystem's coherency protocol, the write to the memory location in memory 130 automatically results in an invalidation of the location in the target processor's cache 123. The polling target processor 120 then needs to go to the main memory 130 again to fetch the data updated by the memory subsystem, adapter 129. The foregoing process, involving a step of a DMA to memory by the adapter, a step of the memory subsystem invalidating the cache, and a step of fetching the new data from memory by the target processor, can result in performance degradation and delays in the communication path, thereby increasing the latency of inter-node communications significantly.

It is, therefore, an object of the present invention to provide a system and mechanism for efficient data transfer between processors.

It is another object of the invention to provide efficient cache injection for user space message passing of messages of varying size and latency.

SUMMARY OF THE INVENTION

The foregoing and other objects are realized by the present system and method which provides injection of important data directly into a processor's cache location when that processor has previously indicated interest in the data. The memory subsystem at a target processor will determine if the memory address of data to be written to a memory location associated with the target processor is found in a processor cache of the target processor. If it is determined that the memory address is found in a target processor's cache, the data will be directly written to that cache at the same time that the data is being provided to a location in main memory. Injection of the data directly to the cache permits the target processor to access the data more quickly, while the simultaneous write to main memory ensures data consistency.

The invention is further adapted to utilize intelligent policies in the caching protocol and in the memory subsystem to determine when cache injection should occur and how cache injection should be controlled. The policies factor in the length and urgency of the message to be transferred in determining the appropriate cache handling.

BRIEF DESCRIPTION OF THE DRAWINGS

The invention will be described in greater detail with reference to the appended drawings wherein.

DETAILED DESCRIPTION OF THE INVENTION

The present invention introduces the concept of cache injection, whereby important data is inserted directly into one or more of a target processor's caches at the same time that the data is being written into a main memory location accessible to the target processor. Data may be injected into a processor's cache by an I/O device or any other memory moving engine.

Figure 2:
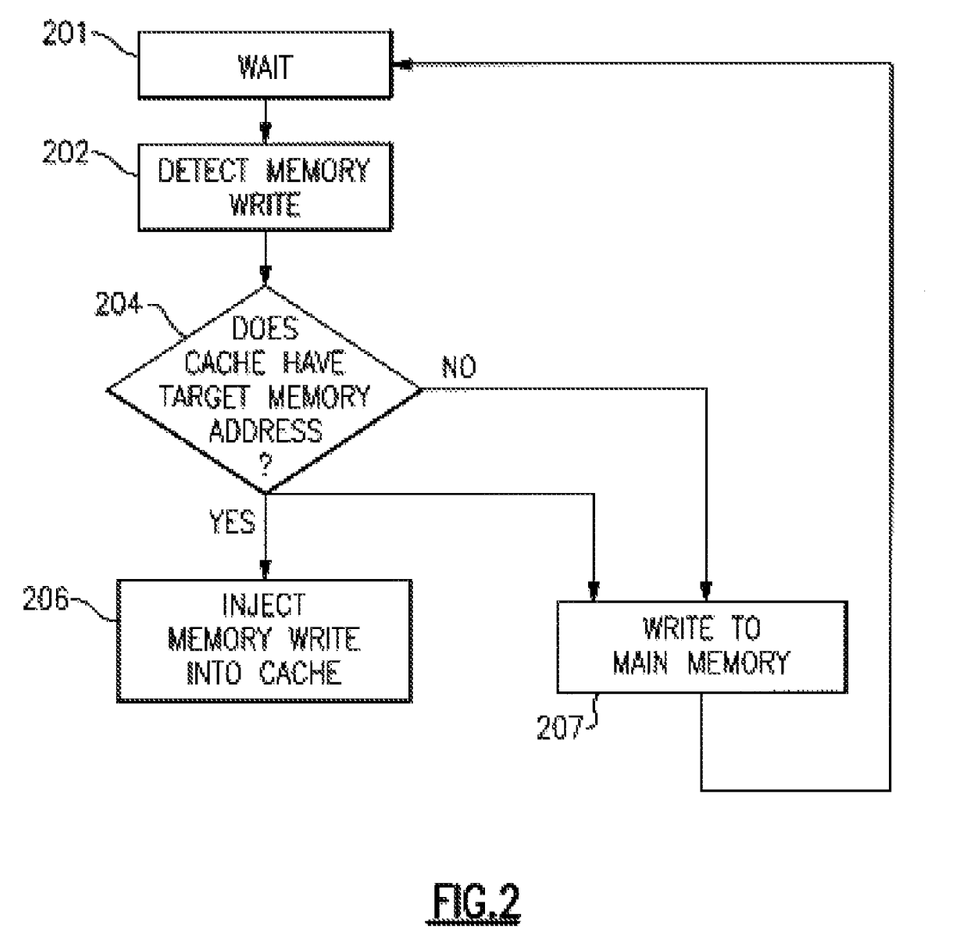
FIG. 2 illustrates the process flow for memory writes in accordance with the present invention.

Under the present invention a method is provided for efficiently processing memory writes in a competing node having at least a processor, a memory subsystem, at least one memory cache associated with the processor and access to a main memory with a plurality of memory locations each having a memory address. As illustrated in FIG. 2, the method initiates with the memory controller at a target location detecting a memory write for a target memory address at step 202. Throughout the ensuing description, the term "memory write" will be used to encompass not only writes, but any updates received at the memory subsystem that it subsequently writes to memory. The memory subsystem next determines, at 204, if at least one memory cache has the target memory address in the cache, thereby indicating that the processor is waiting for the data. Based on the result of the determining step, the memory subsystem implements the memory write at least one time based on the determining. Should the determining indicate that the processor is not waiting for the data (i.e., that the target memory address is not found in the cache), then the memory write is done exclusively to the memory address at the main memory at 207. If, however, the target memory address is found in at least one memory cache, the memory subsystem injects the memory write into the at least one memory cache at 206 and also writes the memory write to the memory address at said main memory at 207.

The proposed mechanism provides a simple method for the processor to request updates to certain locations that it may want to access in the future. The processor can simply pre-fetch the locations into its cache using standard pre-fetch mechanisms offered by present day memory subsystems. Alternatively, the processor can access the memory location, which will result in the location address being loaded into a cache location. Only writes to memory locations that are present in one or more caches are injected, with all other writes going directly to main memory.

The data passing mechanisms of the invention implement the policy that DMA write transactions to memory are cache injected if, and only if, the referenced memory locations are already cached by a central processing unit (CPU). If more than one CPU has the same data cached, then the message passing mechanism (also referred to as the "memory subsystem", "memory controller" and "adapter") has multiple options, including inject in all, injected in any one, invalidate all, and inject in none. With the "already cached" policy, the inventive approach ensures that successive caching decisions have no impact on the working set of the caches. Accordingly, any performance impact will be positive. The data passing software system controls the cache injection by issuing pre-fetch instructions for the cache lines that are of interest to the CPU and is waiting for the DMA write transactions, as further detailed below.

It can be envisioned that there may be instances for which a processor does not require cache injection, despite the presence of one or more memory locations in its cache. For example, where multi-processor locations share a significant amount of memory during a computation, it may be that only a few of the processors are interested in monitoring updates to some of the locations. In those instances, the processor may generate some injection indication that injection is not required. The "hint" may take the form of a flag or other indicator associated with the cache location. Yet another implementation would allow the memory controller to control whether or not data is injected into a cache location, even when the target memory address is indicated in the cache location.

For efficient cache injection mechanisms, it is clear that always injecting into the cache is less than optimal, since the processor may not ever require the DMA data or may not need to consume the data until much later. Injecting into the cache indiscriminately may further cause cache eviction of memory locations that were part of the active working set of computations on the processor. Another consideration for efficient cache injection is a determination as to where incoming data should be injected. With large multi-processor systems, it is preferable to provide an intelligent mechanism for managing caching since, even if a fast cache-to-cache transfer mechanism exists, the issue of cache pollution and possible eviction of cache lines in the active working set are critical issues. Accordingly, memory controllers of the memory subsystems optimally need to determine the following: (a) if incoming data from DMA writes should be cache injected; (b) into which processor's cache should the data be injected; (c) where in the cache hierarchy should injection occur; and (d) how many cache lines of the incoming message should be injected. In making the determinations, the intelligent memory controller should also balance the advantage of avoiding a cache miss when the processor needs the data against the risk that the cache injection may toe rejecting cache lines in the active working set. Further considerations include the software's ability to pre-fetch subsequent cache lines of a large message consistent with the access pattern as needed by the application (since the application may not be consuming the data in order) and the time at which the processor will need the memory to be available in cache. Latency-critical messages which are needed by a processor will necessarily take priority over less critical messages. As stated above, it is preferable that the memory controller have the discretion to inject or not inject based on the foregoing considerations, even when the target memory address is found in the cache and the processor has not provided an injection indicator.

The invention is further described below with reference to example transport protocols that incur DMA transactions on clustered based supercomputers, such as those manufactured by International Business Machines Corporation (IBM). These concepts apply to any data movement mechanism, and are not limited to IO devices; however, for ease and consistency of description, the example usage models on IBM systems are used to explain the concepts for intelligent control of cache injection. With reference to usage models on IBM clustered based supercomputers, specific implementations of the invention will be detailed with reference to FIGS. 3-7A and 7B. For the purposes of the ensuing description, data transfers are divided into categories including user space message passing of latency-critical messages of less than or equal to one cache line Message Passing Interface (MPI) messages, user space message passing of medium sized messages making use of an asynchronous data mover, user space message passing by remote DMA (RDMA) transport for larger messages; Internet protocol (IP) transport layer message passing for short messages using an asynchronous data mover, IP transport layer message passing for RDMA messages, and file system data transfers. The present invention provides improved cache injection for all of the foregoing data transfers.

Figure 3:
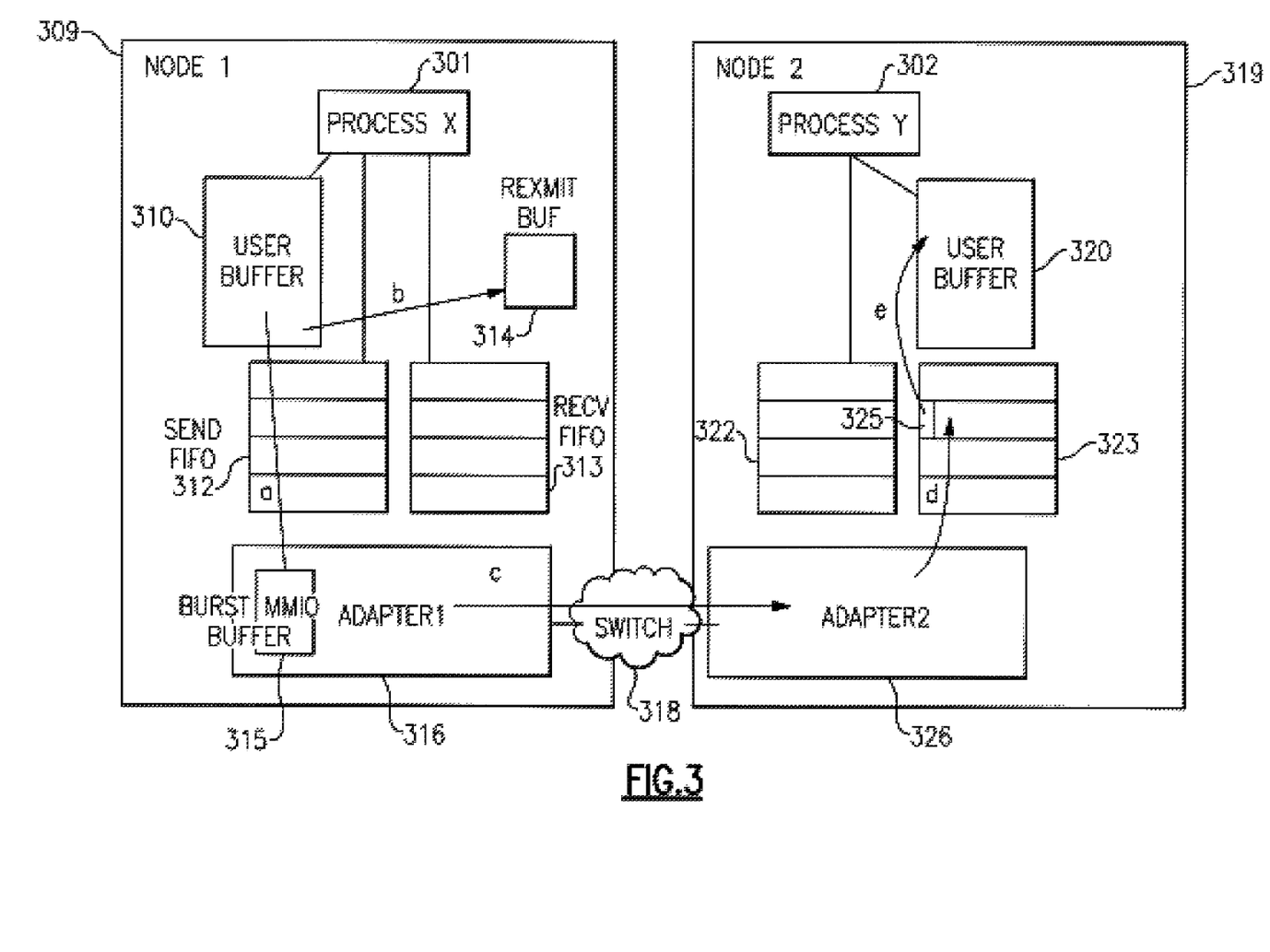
FIG. 3 illustrates message passing between nodes across a network switch in accordance with the present invention.

FIG. 3 illustrates user space message passing between processing nodes, Node 1 at 309 and Node 2 at 319, in accordance with one embodiment of the subject invention for passing latency-critical messages that are relatively small (e.g., of less than or equal to one cache line). The address space for process x, 301 at Node 1, 309, comprises a user buffer 310, send buffer 312 implemented as a first-in-first-out (FIFO) buffer, a receive buffer 313 implemented as a FIFO, Adapter1 at 316 comprising the memory subsystem or memory controller, herein illustrated as a Burst memory-mapped I/O (MMIO) buffer 315, and a retransmit buffer 314. The address space for process y, 302 at Node 2, 319, comprises user buffer 320, send and receive FIFO buffers, 322 and 323 respectively, and Adapter2 at 326. Receive buffer 323 is illustrated with FIFO slot cache line 325 into which a message is injected as further detailed below.

Data flows along arrow a from the user buffer 310 to the Burst MMIO buffer 315. The cache line is also copied into the retransmit buffer 314 as shown by arrow b. Adapter1 injects the message into the network, across switch 318, along arrow c, to Adapter2. At Node 2 the Adapter2 performs a DMA transfer of the arriving message into the appropriate FIFO slot cache line, 325, as shown by arrow d. As noted above, the target processor, process y at 302, would have been waiting for the data and polling cache line 325 to try to access the data. Accordingly, the memory subsystem of Adapter2 at 326 injects the data into that cache location polled by process y. The protocol copies the data from the FIFO slot cache line 325 of FIFO 323 into the user's receive buffer 320 as shown along arrow e.

Figure 4:
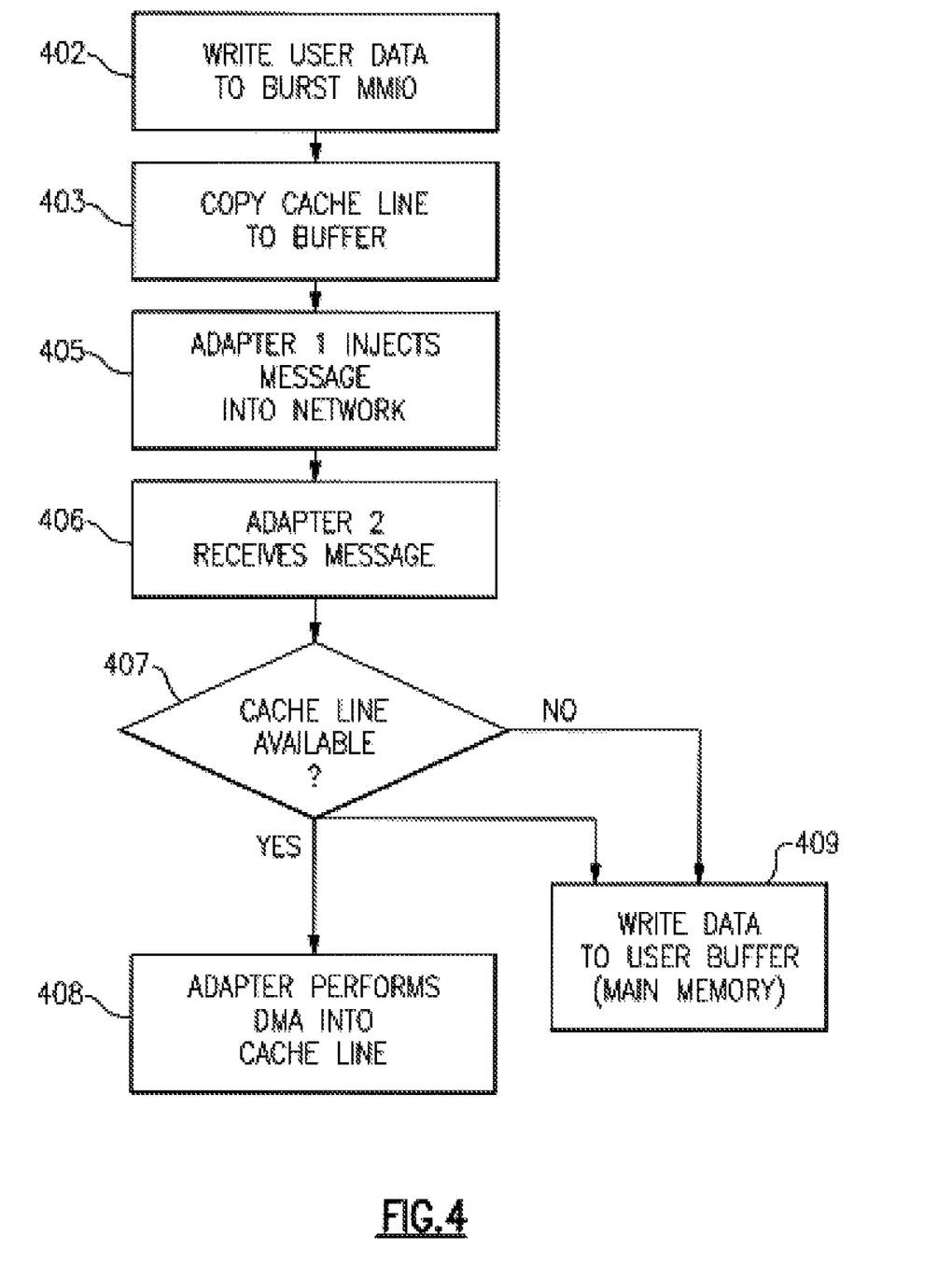
FIG. 4 illustrates the process flow for passing latency-critical messages of less than or equal to one cache line in accordance with the present invention.

The latency flow for the system illustrated in FIG. 3 is detailed in the process flow of FIG. 4. User data in the user buffer can be assumed to be in cache: the user having just worked on it. Since the data to be cached is small (e.g., one or two cache lines) for this illustrated implementation, the processor writes the user data from the user buffer 310 into the burst MMIO buffer 315 on Adapter1 at 316, in step 402. A cache line copy is made in the retransmit buffer at step 403. The retransmit buffer may optionally be set up to be cache-injected; however, it is unlikely that the CPU will need the data in the retransmit buffer. Once the data has been provided to the MMIO buffer, the sending side adapter, Adapter1, injects the message into the network at step 405, after which it arrives on the receiving side adapter, Adapter2, at step 406.

On the receiving side, the memory subsystem determines, at step 407, whether there is already a line for that FIFO slot. If no processor has this FIFO slot cached then the data should not be cache injected since no process is waiting for this message. If no FIFO slot is available and waiting for the data, the data is discarded as shown at step 410. However, when the FIFO slot, 325 as illustrated, is available, indicating that the process is waiting for the data, then the receiving side adapter 326 performs a DMA of the arriving message to write it into the FIFO cache line at step 408. The data is also copied from the FIFO into the user's receive buffer 320 or main memory location, at step 409, for the posted MPI_Recv processor operation.

Figure 5:
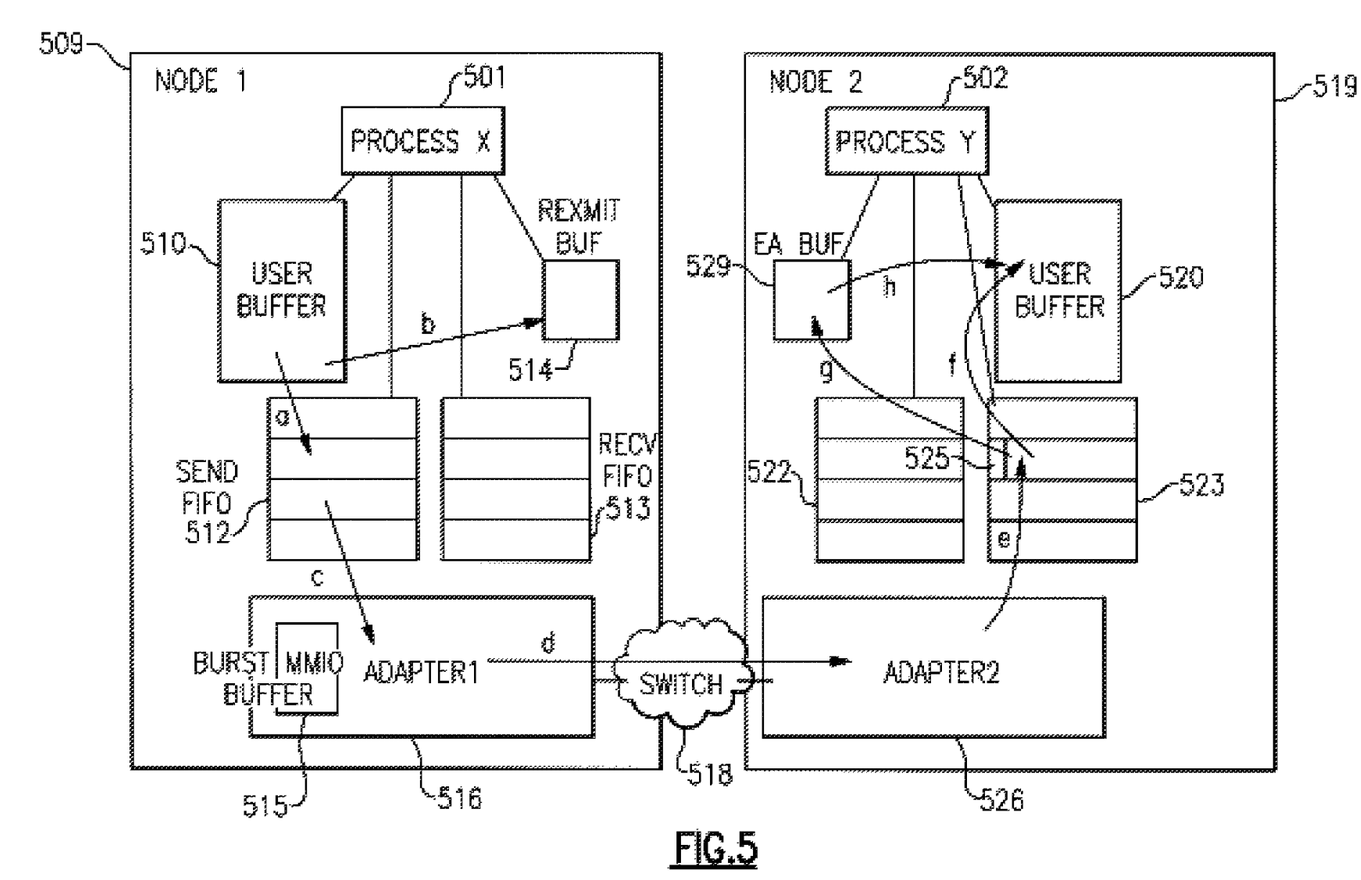
FIG. 5 illustrates user space message passing between processing nodes in accordance with another embodiment of the subject invention using an asynchronous data mover.

FIG. 5 depicts the address space and data flow for user space message passing of medium-sized messages, where the message size exceeds the capacity of the Burst MMIO buffer but is less than the RDMA cut off size. As depicted in FIG. 5, the address space for process x, 501 at Node 1, 509, comprises a user buffer 510, send buffer 512 implemented as a FIFO, a receive buffer 513 implemented as a FIFO, Adapter1 at 516 comprising a Burst MMIO buffer 515, and a retransmit buffer 514. The address space for process y, 502 at Node 2, 519, comprises user buffer 520, send and receive FIFO buffers, 522 and 523 respectively, Adapter2 at 526, as well as an early arrival (EA) buffer. Receive buffer 523 is illustrated with FIFO slot cache line 525 into which a message is injected as further detailed below. Data flows along arrow a from the user buffer 510 to the send FIFO 512 as a cache-to-cache transfer along arrow a. The send buffer is sized appropriately for the message to fit in the cache. Thereafter, the sending side adapter, Adapter1, performs a DMA of the data from the send FIFO along arrow c. The cache line is also copied into the retransmit buffer 514, which is not set up for cache injection, as shown by arrow b. Adapter1 injects the message into the network, across switch 518 along arrow d, to Adapter2 at 526. The receiving side adapter transfers the data via DMA into the receive FIFO as shown at arrow e. The first cache line of the receive FIFO entry should preferably be cache injected if the receiving side process had that cache line in its cache. As discussed above, injection indicators or memory controller weighing of factors may influence whether the data is injected into a cache.

The processor which had the first cache line in its cache should be the processor into whose cache the memory subsystem injects the first cache line. The subsequent cache lines probably should not be injected. Accordingly, the asynchronous data mover is used for moving the data from the receive fifo to the user buffer 520 or the early arrival buffer 524. In both cases, it would be preferable to inject only the first cache line, to prompt the protocol to pre-fetch those cache lines, which then provides a "hint" to the memory subsystem indicating that the memory subsystem should inject those lines (and into which processor's cache). In all these cases the first cache line concept could be extended to the first few cache lines, matching match up the pre-fetch and access times from main memory of the subsequent cache lines. The protocol can issue pre-fetches for subsequent cache lines as it needs it, since not all of the data may be consumed by the receiving side and may not be consumed in order.

Figure 6:
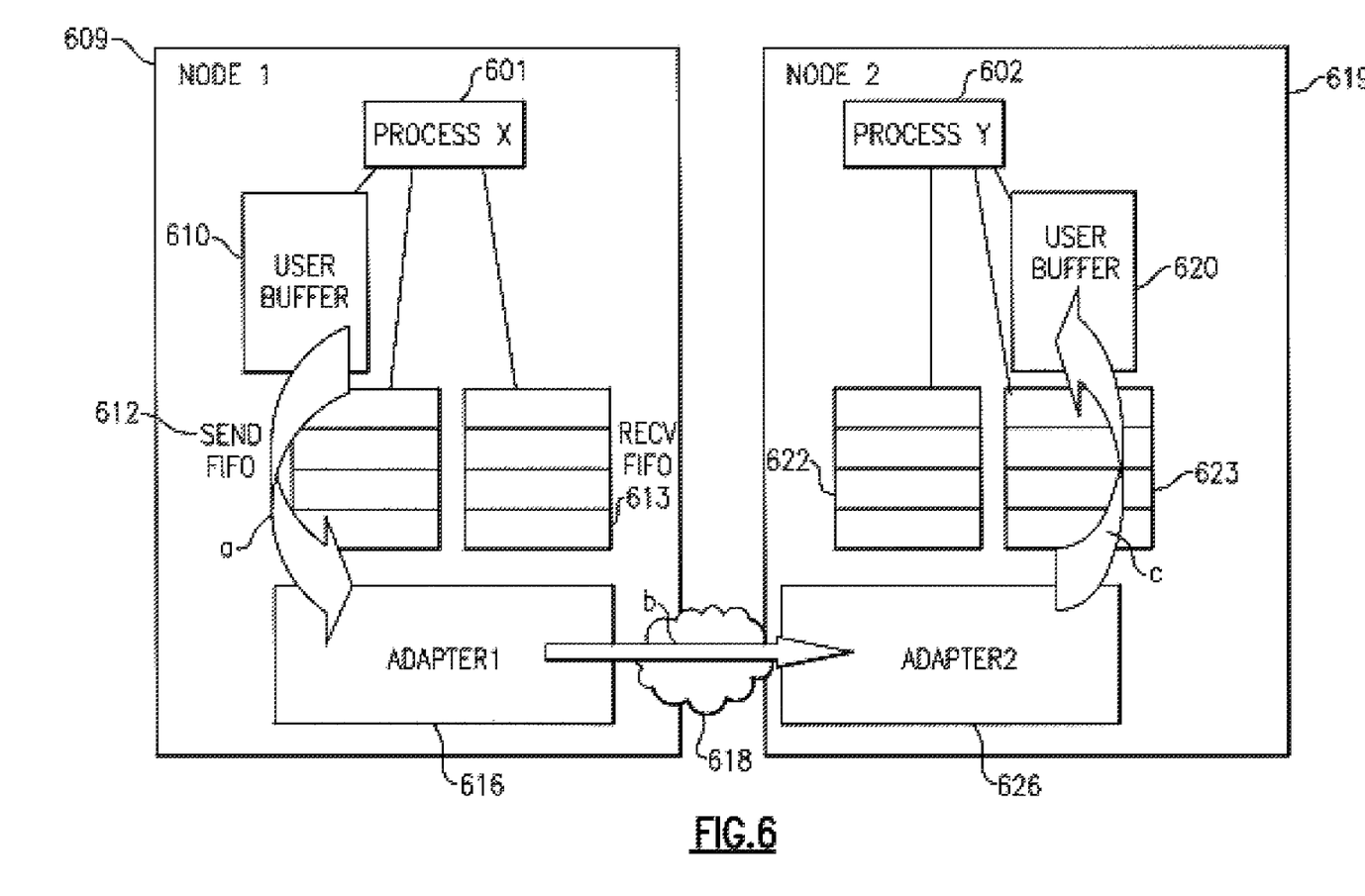
FIG. 6 illustrates user space data flow between processing nodes in accordance with an embodiment of the invention for transport of large messages.

For the transfer of large messages, the data flow across the users' address spaces is illustrated in FIG. 6. The address space for process x, 601 at Node 1, 609, comprises a user buffer 610, a send buffer 612 implemented as a FIFO, a receive buffer 613 implemented as a FIFO, and Adapter1 at 616. The address space for process y, 602 at Node 2, 619, comprises user buffer 620, send and receive FIFO buffers, 622 and 623 respectively, and Adapter2 at 626. RDMA data transfer flow along arrow a from the user buffer 610 to the Adapter1 at 616, from Adapter1 across network 616 to Adapter2 along arrow b, and from Adapter2 to the user buffer 620 along arrow c. The control flow and completion messages are also depicted in FIG. 6. Cache injection of the RDMA message depends on the same set of issues as in the asynchronous data mover.

The selection of into which processor's cache the injection should occur is always based on the CPU which already has that (stale) cache line in its cache. In all of the above no cache injection occurs if no processor has the (stale) cache line in its case. Partial cache line DMAs should not occur for RDMA transfers. Before returning control to the user from the communication subsystem the protocol should make sure that the appropriate pre-fetch hints are issued to the memory subsystem for the next set of cache lines it will be reading in the FIFOS in the early arrival buffers and in the appropriate receive buffers.

When memory is shared among two or more tasks, it is expected that the data mover should be able to assist in the data moves in both the short memory case, where the data is staged through the shared memory, and in the large message case, where the data is moved directly from the source buffer to the target buffer in a different address space. In the short message case the data is staged through the shared memory segment. The shared memory segment is not cache injected, whereas the move from the shared memory segment into the target buffer should be cache injected. Again the number of cache lines injected should be dictated by the protocol issuing appropriate pre-fetches of the appropriate set of cache lines.

Figure 7A:
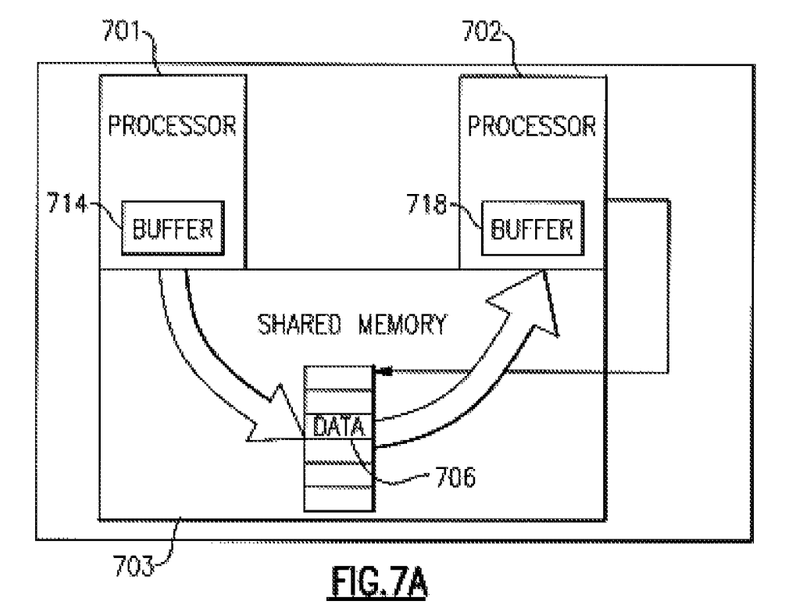
FIGS. 7A and 7B illustrate user space message passing for short and long messages, respectively, for shared memory systems.

FIG. 7A illustrates data transfer between processors 701 and 702 that share memory 703. In the instance where the memory write is relatively small, on the order of one cache line, the data will be sent directly from the buffer 714 associated with sending processor 701 to a shared memory location 706 and read directly from that shared location into the buffer 718 associated with target processor 702.

Figure 7B:
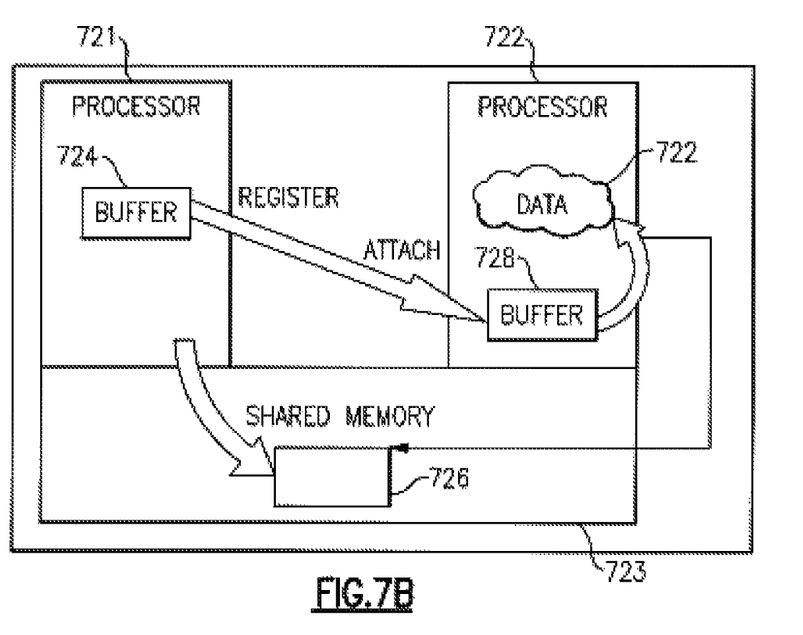

FIG. 7B illustrates data transfer between processors 721 and 722 that share memory 723. In the illustrated instance, the data to be written is a large message and cannot simply be written into and out of a single line of the shared memory. In the large message instance, assuming that the target processor 722 is waiting for the data, the data will simultaneously be written from buffer 724 associated with the sending processor 721 directly into buffer 728 associated with processor 722 and be written into a memory location 726 in the shared memory 723.

The above description is only illustrative, intended to enable those skilled in the art to implement the present invention, and not as limitations on the present invention. The various steps in the described methods according to the various embodiments of the present invention may also be performed in a different order, or some steps may be added, deleted, or replaced, without departing from the scope and spirit of the present invention. The various components in the described apparatuses and systems according to the various embodiments of the present invention can be implemented as software, firmware, hardware, or any combination thereof, and these components can be split or combined, provided the functions can be realized. In a preferred implementation, these apparatuses are a combination of general purpose computer hardware and the corresponding software functional modules. The claimed scope of invention is not defined by the above description, but uniquely defined by the following claims.

The invention claimed is:

1. A method of transferring messages in a multi-processing system, the method comprising:
   detecting that a write operation of a message to a target buffer is being performed;
   responsive to the detecting, determining whether a memory address of the target buffer is present in a cache memory of the multi-processing system;
   further responsive to the detecting, reading an indication that indicates whether or not the message should be injected into the cache memory;
   responsive to the indication indicating that the message should be injected into the cache memory, selectively injecting at least a portion of the message into the cache memory; and
   responsive to the indication indicating that the message should not be injected into the cache memory, performing the write operation without injecting any of the message into the cache memory.

2. The method of claim 1, wherein the cache memory is one of multiple cache memories implementing levels of a cache hierarchy, wherein the indication indicates a particular one of the levels of the cache hierarchy in which to perform the injecting, wherein the injecting is performed into a particular one of the multiple cache memories implementing the level indicated by the indication.

3. The method of claim 1, wherein the indication indicates whether or not the injecting should be performed for the message.

4. The method of claim 3, further comprising:
   determining that the message is a latency-critical message; and
   setting the indication responsive to determining that the message is a latency-critical message so that the at least a portion of the message will be injected into the cache memory by the injecting.

5. The method of claim 1, wherein the indication indicates a size of the at least a portion of the message that should be injected by the injecting, and wherein the injecting selectively injects the at least a portion of the message in conformity with the indicated size.

6. The method of claim 5, wherein the indication indicates a number of cache lines of the message to be in injected by the injecting.

7. The method of claim 5, wherein the cache memory is one of multiple cache memories implementing levels of a cache hierarchy, wherein the indication further indicates a particular one of the levels of the cache hierarchy in which to perform the injecting, wherein the injecting is performed into a particular one of the multiple cache memories implementing the level indicated by the indication.

8. A memory controller comprising logic for:
   detecting that a write operation of a message to a target buffer is being performed;
   responsive to the detecting, determining whether a memory address of the target buffer is present in a cache memory of the multi-processing system;
   further responsive to the detecting, reading an indication that indicates whether or not the message should be injected into the cache memory;
   responsive to the indication indicating that the message should be injected into the cache memory, selectively injecting at least a portion of the message into the cache memory; and responsive to the indication indicating that the message should not be injected into the cache memory, performing the write operation without injecting any of the message into the cache memory.

9. The memory controller of claim 8, wherein the cache memory is one of multiple cache memories implementing levels of a cache hierarchy, wherein the indication indicates a particular one of the levels of the cache hierarchy in which to perform the injecting, wherein the logic for injecting performs the injecting into a particular one of the multiple cache memories implementing the level indicated by the indication.

10. The memory controller of claim 8, wherein the indication indicates whether or not the injecting should be performed for the message.

11. The memory controller of claim 10, wherein the indication indicates that the message is a latency-critical message.

12. The memory controller of claim 8, wherein the indication indicates a size of the at least a portion of the message that should be injected by the injecting, and wherein the logic for injecting selectively injects the at least a portion of the message in conformity with the indicated size.

13. The memory controller of claim 12, wherein the indication indicates a number of cache lines of the message to be in injected by the injecting.

14. The memory controller of claim 12, wherein the cache memory is one of multiple cache memories implementing levels of a cache hierarchy, wherein the indication further indicates a particular one of the levels of the cache hierarchy in which to perform the injecting, wherein the logic for injecting performs the injecting into a particular one of the multiple cache memories implementing the level indicated by the indication.

15. A program storage device readable by machine, the program storage device tangibly embodying a program of instructions executable by the machine for transferring messages in a multi-processing system, the program instructions comprising program instructions for selectively indicating to a memory controller of the multi-processing system whether a message should be injected into a cache memory implicated by a write of the message to a target buffer.

16. The program storage device of claim 15, wherein the cache memory is one of multiple cache memories implementing levels of a cache hierarchy, wherein the program instructions for selectively indicating indicate a particular one of the multiple cache memories in which the memory controller is to perform the injecting.

17. The program storage device of claim 15, wherein the program instructions for selectively indicating indicate whether or not the injecting should be performed for the message.

18. The program storage device of claim 17, further comprising program instructions for:
  determining that the message is a latency-critical message; and
  performing the indicating responsive to determining that the message is a latency-critical message so that the at least a portion of the message will be injected into the cache memory by the memory controller.

19. The program storage device of claim 15, wherein the program instructions for selectively indicating indicate a size of the at least a portion of the message that should be injected by the memory controller, and wherein the memory controller selectively injects the at least a portion of the message in conformity with the indicated size.

20. A computer system comprising multiple processors for executing program instructions coupled to at least one memory for storing the program instructions, and further coupled to a memory controller that selectively injects data written to a memory location by write operations to a cache memory if the memory location is present in the cache memory, and wherein the program instructions comprise program instructions for selectively indicating to the memory controller whether the message should be injected into the cache memory.

* * * * *